(12) United States Patent
Kindo

(10) Patent No.: US 11,042,160 B2
(45) Date of Patent: Jun. 22, 2021

(54) AUTONOMOUS DRIVING TRAJECTORY DETERMINATION DEVICE

(71) Applicant: TOYOTA JIDOSHA KABUSHIKI KAISHA, Toyota (JP)

(72) Inventor: Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 16/255,965

(22) Filed: Jan. 24, 2019

(65) Prior Publication Data

US 2019/0302777 A1 Oct. 3, 2019

(30) Foreign Application Priority Data

Mar. 28, 2018 (JP) .............................. JP2018-062593

(51) Int. Cl.
*G05D 1/02* (2020.01)
*G05D 1/00* (2006.01)

(52) U.S. Cl.
CPC ......... *G05D 1/0212* (2013.01); *G05D 1/0088* (2013.01); *G05D 1/0231* (2013.01); *G05D 1/0257* (2013.01); *G05D 2201/0213* (2013.01)

(58) Field of Classification Search
CPC .. G05D 1/0212; G05D 1/0088; G05D 1/0231; G05D 1/0257; G05D 2201/0213
See application file for complete search history.

(56) References Cited

U.S. PATENT DOCUMENTS

| 9,373,014 | B1* | 6/2016 | Mehranfar | G06K 7/10366 |
| 9,589,448 | B1* | 3/2017 | Schneider | G08B 13/1965 |
| 10,042,086 | B1* | 8/2018 | Smalley | G01J 5/089 |
| 10,655,968 | B2* | 5/2020 | Rezvani | G01C 21/343 |

(Continued)

FOREIGN PATENT DOCUMENTS

| JP | 2010182236 A | 8/2010 |
| JP | 4730378 B2 | 7/2011 |

OTHER PUBLICATIONS

Shalev-Shwartz et al., "On an Formal Model of Safe and Scalable Self-driving Cars", Mobileye, 2017, pp. 1-30.

*Primary Examiner* — Hussein Elchanti
(74) *Attorney, Agent, or Firm* — Sughrue Mion, PLLC

(57) ABSTRACT

An autonomous driving trajectory determination device that is configured to determine an autonomous driving trajectory of a vehicle is configured to include: a standard trajectory generation unit configured to generate a standard trajectory for the autonomous driving of the vehicle; a moving object behavior detection unit configured to detect a behavior of a moving object; a deviating moving object detection unit configured to detect a deviating moving object that deviates from a standard state set in advance based on the behavior of the moving object and the map information; a number-of-deviating-moving objects calculation unit configured to calculate the number of deviating moving objects, which is the number of deviating moving objects interfering with the standard trajectory; and a trajectory determination unit configured to determine whether or not to set the standard trajectory as the autonomous driving trajectory based on the number of deviating moving objects.

13 Claims, 5 Drawing Sheets

(56) References Cited

U.S. PATENT DOCUMENTS

| | | |
|---|---|---|
| 2004/0073368 A1* | 4/2004 | Gonzalez-Banos ...... G05D 1/12 701/301 |
| 2009/0162825 A1 | 6/2009 | Sakai et al. |
| 2011/0112660 A1* | 5/2011 | Bergmann ............. G08B 17/00 700/29 |
| 2011/0313664 A1 | 12/2011 | Sakai et al. |
| 2017/0341746 A1* | 11/2017 | Erickson ................ G06N 7/005 |
| 2018/0178781 A1* | 6/2018 | Funk .................... B60W 30/08 |
| 2019/0012887 A1* | 1/2019 | Troesch ............... G08B 27/006 |
| 2019/0217131 A1* | 7/2019 | Zechlin .............. G06K 9/00771 |

* cited by examiner

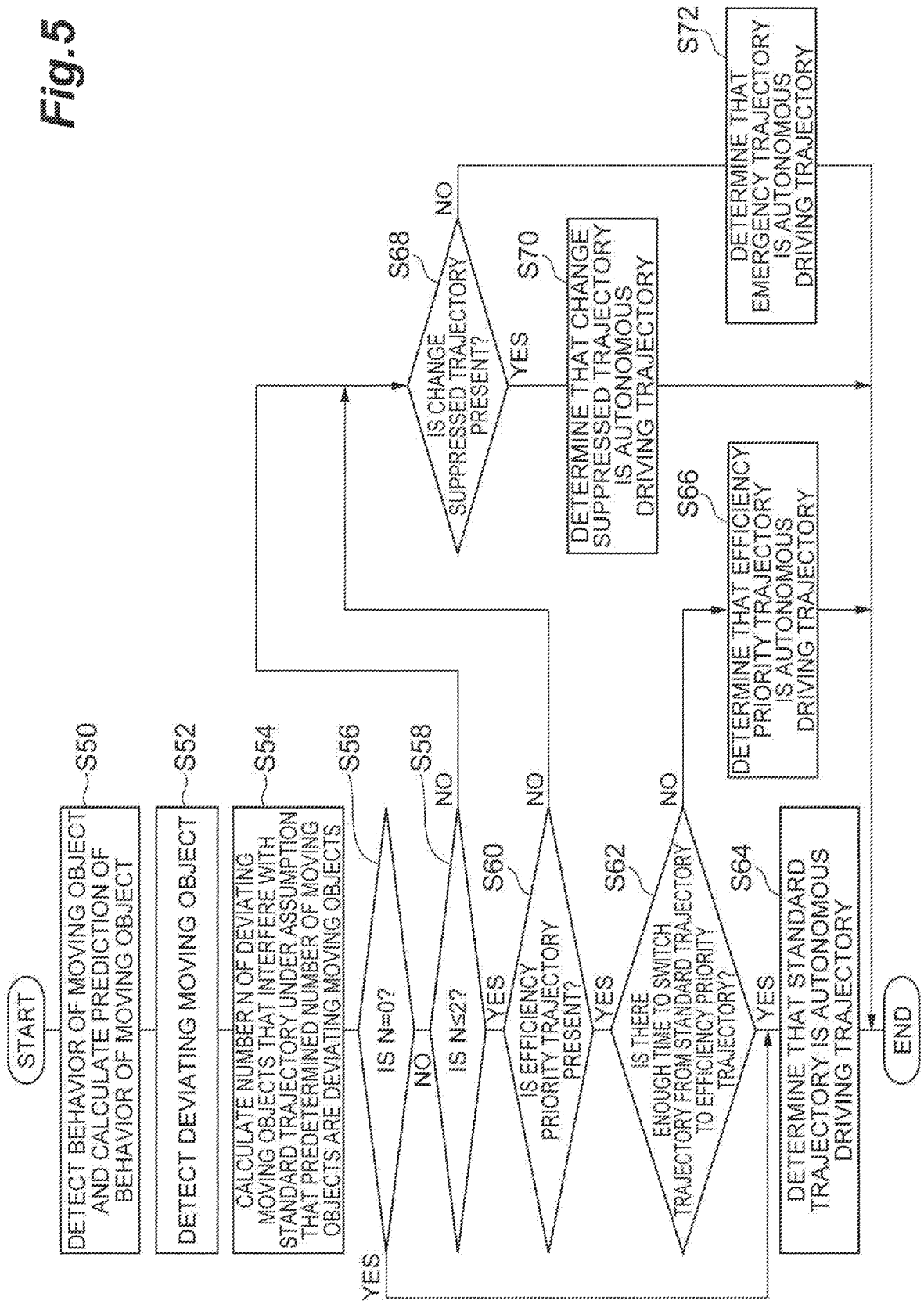

AUTONOMOUS DRIVING TRAJECTORY DETERMINATION DEVICE

TECHNICAL FIELD

The present disclosure relates to an autonomous driving trajectory determination device.

BACKGROUND

In the related art, Japanese Patent No. 4730378 is known as a technical literature relating to an autonomous driving trajectory determination. In this publication, a device is described, which generates a group of plurality of prediction trajectories as a vehicle trajectory and performs a trajectory evaluation for each prediction trajectory group based on a position of another vehicle and the like.

CROSS-REFERENCE TO RELATED APPLICATION

This application claims the benefit of priority from Japanese Patent Application No. 2018-062593, filed Mar. 28, 2018, the entire contents of which are incorporated herein by reference.

SUMMARY

Incidentally, in the device in the related art described above, the trajectory evaluation is performed based on the position of a moving object such as another vehicle, however, it is difficult to fully consider a moving object in the standard state such as traveling within a lane below a speed limit and a moving object deviating from the standard state. In the determination of the autonomous driving trajectory, it is considered that the moving object deviating from the standard state exerts a large influence on the vehicle trajectory, therefore, it is desirable to take the moving object deviating from the standard state into consideration.

Therefore, in this technical field, it is desired to provide an autonomous driving trajectory determination device that can appropriately determine an autonomous driving trajectory based on the number of deviating moving objects deviating from the standard state set in advance.

In an aspect of the present disclosure, there is provided an autonomous driving trajectory determination device that is configured to determine an autonomous driving trajectory of a vehicle that is configured to include: a standard trajectory generation unit configured to generate a standard trajectory for the autonomous driving of the vehicle based on a position of the vehicle on a map and map information; a moving object behavior detection unit configured to detect a behavior of a moving object including at least a position of another moving object other than the vehicle on the map and a speed; a deviating moving object detection unit configured to detect a deviating moving object that deviates from a standard state set in advance based on the behavior of the moving object and the map information; a number-of-deviating-moving objects calculation unit configured to calculate the number of deviating moving objects, which is the number of deviating moving objects interfering with the standard trajectory; and a trajectory determination unit configured to determine whether or not to set the standard trajectory as the autonomous driving trajectory based on the number of deviating moving objects.

According to the autonomous driving trajectory determination device in an aspect of the present disclosure, the deviating moving objects deviating from the standard state set in advance is detected based on the behavior of the moving object and the map information and the number of deviating moving objects which is the number of deviating moving objects interfering with the standard trajectory is calculated, and then, whether or not to set the standard trajectory as the autonomous driving trajectory is determined based on the number of deviating moving objects. Therefore, it is possible to appropriately determine the autonomous driving trajectory compared to the case where the number of deviating moving objects interfering with the standard trajectory is not taken into consideration.

The autonomous driving trajectory determination device according to the aspect of the present disclosure may be configured to further include a behavior prediction calculation unit configured to calculate a moving object behavior prediction which is a behavior prediction of the moving object based on the behavior of the moving object and the map information. The deviating moving object detection unit may be configured to detect the deviating moving object based on the behavior of the moving object, the moving object behavior prediction, and the map information.

According to this autonomous driving trajectory determination device, it is possible to detect the moving object which has not deviated from the standard state yet as a deviating moving object in advance using the moving object behavior prediction. Therefore, it is possible to appropriately determine the autonomous driving trajectory.

The autonomous driving trajectory determination device according to the aspect of the present disclosure may be configured to further include an efficiency priority trajectory generation unit configured to generate an efficiency priority trajectory in which a priority is given to the traveling efficiency. The trajectory determination unit may be configured to determine whether or not to set the efficiency priority trajectory as the autonomous driving trajectory based on the number of deviating moving objects.

According to this autonomous driving trajectory determination device, it is possible to appropriately determine whether or not to set the efficiency priority trajectory in which the priority is given to the traveling efficiency as the autonomous driving trajectory by taking the number of deviating moving objects into consideration.

The autonomous driving trajectory determination device according to the aspect of the present disclosure may be configured to further include a change suppressed trajectory generation unit configured to generate a change suppressed trajectory in which a priority is given to suppression of a change of a surrounding situation of the vehicle. The trajectory determination unit may be configured to determine whether or not to set the change suppressed trajectory as the autonomous driving trajectory based on the number of deviating moving objects.

According to this autonomous driving trajectory determination device, it is possible to appropriately determine whether or not to set the change suppressed trajectory having the priority on suppressing the change of surrounding situation of the vehicle as the autonomous driving trajectory by taking the number of deviating moving objects into consideration.

In the autonomous driving trajectory determination device in the aspect of the present disclosure, the number-of-deviating-moving objects calculation unit may be configured to calculate the number of deviating moving objects under the assumption that a predetermined number of moving objects out of the moving objects which are not the deviating moving objects around the vehicle are the deviating moving object.

According to this autonomous driving trajectory determination device, by calculating the number of deviating moving objects under the assumption that a predetermined number of moving objects are the deviating moving objects around the vehicle, it is possible to determine the autonomous driving trajectory that can cope with a case where the moving object in the standard state deviates from the standard state.

As described above, according to the aspects of the present disclosure, it is possible to appropriately determine the autonomous driving trajectory based on the number of deviating moving objects.

BRIEF DESCRIPTION OF THE DRAWINGS

FIG. 5 is a flowchart illustrating an example of trajectory determination processing in the second embodiment.

DETAILED DESCRIPTION

Hereinafter, embodiments of the disclosure will be described with reference to the drawings.

First Embodiment

Figure 1:
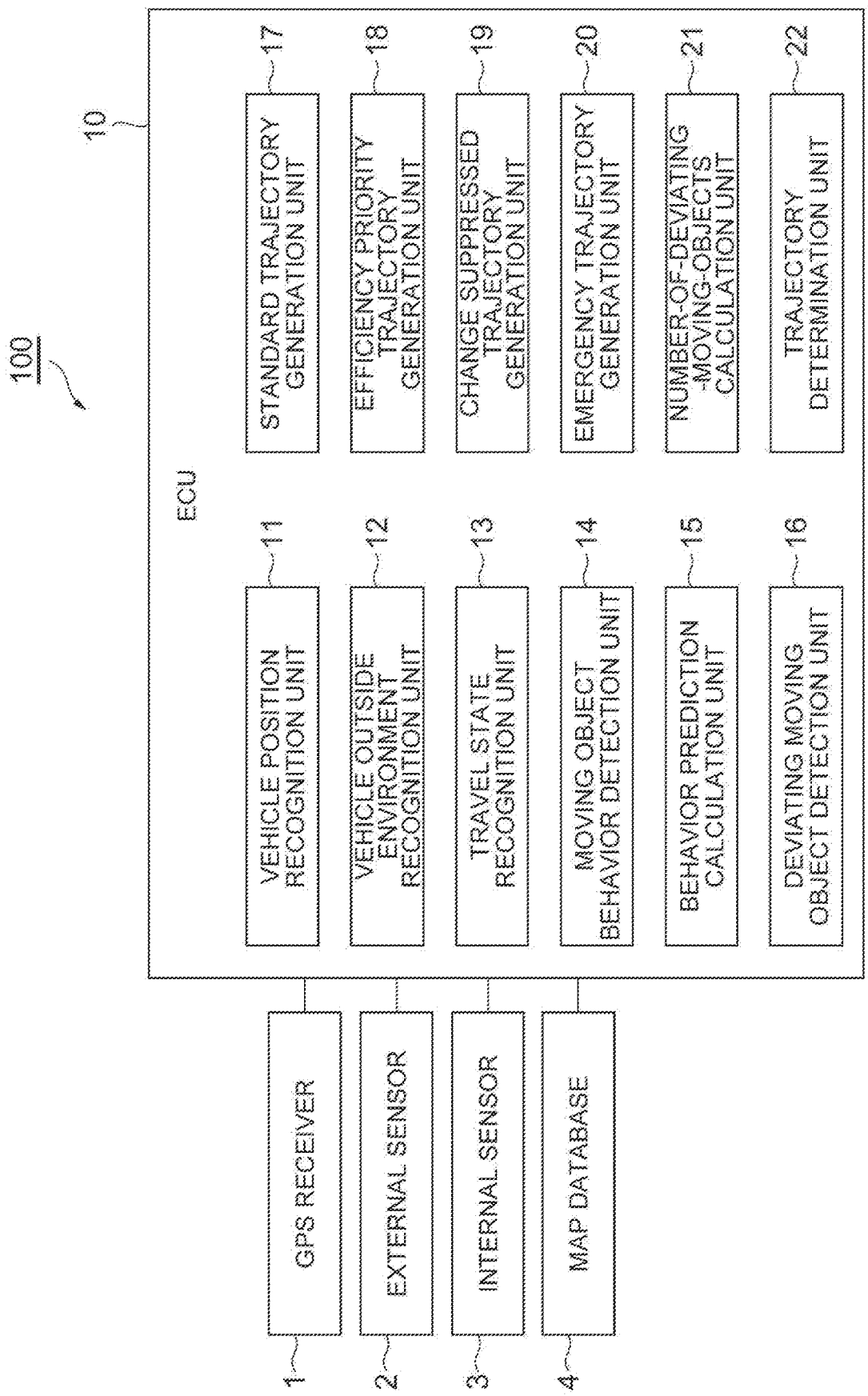
FIG. 1 is a block diagram illustrating an autonomous driving trajectory determination device in a first embodiment.

An autonomous driving trajectory determination device 100 in a first embodiment illustrated in FIG. 1 is mounted on a vehicle and is a device for determining an autonomous driving trajectory of the vehicle. The autonomous driving trajectory of the vehicle includes a path and a vehicle speed. Here, it is assumed that the autonomous driving trajectory is a trajectory in which the vehicle travels for seconds or minutes.

The autonomous driving means, for example, a driving state in which the vehicle is caused to autonomously travel along the road on which a host vehicle travels. The autonomous driving also includes, for example, a driving state in which the host vehicle is caused to autonomously travel toward a destination set in advance without a driving operation by a driver. The autonomous driving includes an autonomous driving level 2 to an autonomous driving level 4 in SAE (Society of Automotive Engineers) J3016. The autonomous driving trajectory determination device 100 may be a part of an autonomous driving system.

Configuration of Autonomous Driving Trajectory Determination Device in First Embodiment Hereinafter, a configuration of the autonomous driving trajectory determination device 100 in the first embodiment will be described with reference to the drawings. As illustrated in FIG. 1, the autonomous driving trajectory determination device 100 is provided with an (electronic control unit (ECU) 10 that performs overall management of the system. The ECU 10 is an electronic control unit including a central processing unit (CPU), read only memory (ROM), random access memory (RAM), a controller area network (CAN) communication circuit, and the like. In the ECU 10, various kinds of vehicle control are performed by loading the program stored in the ROM into the RAM and executing the program by the CPU. The ECU 10 may be configured with a plurality of electronic control units.

The ECU 10 is connected to a GPS receiver 1, an external sensor 2, an internal sensor 3, and a map database 4.

The GPS receiver 1 measures a position of a vehicle (for example, latitude and longitude of the vehicle) by receiving signals from equal to or more than three GPS satellites. The GPS receiver 1 transmits information on the measured position of the vehicle to the ECU 10.

The external sensor 2 is a detection device that detects a situation around the vehicle. The external sensor 2 includes at least one of a camera and a radar sensor. The external sensor 2 is configured so as to reconstruct the properties (the position of the vehicle, a relative distance to a moving object, a relative speed to the moving object, a direction of the moving object, a shape of a lane, a lighting state of a traffic signal, and the like) of outside environments for the vehicle's traveling.

The camera is an imaging device that images external situations of the vehicle. The camera is provided on the back side of the windshield of the vehicle. The camera transmits imaging information on the external situation of the vehicle to the ECU 10. The camera may be a monocular camera or may be a stereo camera. The stereo camera includes two imaging units arranged to reproduce binocular parallax. The image information of the stereo camera also includes information on the depth direction.

The radar sensor is a detection device that detects the moving object around the vehicle using radio waves (for example, millimeter waves) or light. The radar sensor includes, for example, millimeter wave radar or Light Detection and Ranging (LIDAR). The radar sensor transmits the radio wave or light to the surroundings of the vehicle, and detects the moving object or a stationary object by receiving the radio waves or light reflected from the moving object. The radar sensor transmits the information on the detected moving object to the ECU 10. The moving object includes a moving object such as a pedestrian, a bicycle, and other vehicles. The stationary object includes utility poles, buildings, traffic signals, and the like. The stationary object may include lane lines.

The internal sensor 3 is a detection device that detects a travel state of the vehicle. The internal sensor 3 includes a vehicle speed sensor, an accelerator sensor, and a yaw rate sensor. The vehicle speed sensor is a measurement device that measures a speed of vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measurement device that measures an acceleration of the vehicle. The accelerator sensor includes, for example, a longitudinal accelerator sensor that measures acceleration in the longitudinal direction of the vehicle and a lateral accelerator sensor that measures a lateral acceleration of the vehicle. The accelerator sensor transmits, for example, information on the acceleration of the vehicle to the ECU 10. The yaw rate sensor is a measurement device that measures a yaw rate (a rotation angular velocity) around the vertical axis at the center of gravity of the vehicle. As the yaw rate sensor, for example, a Gyro sensor can be used. The yaw rate sensor transmits the information on the measured yaw rate of the vehicle to the ECU 10.

The map database 4 is a database that stores map information. The map database 4 is formed, for example, in a hard disk drive (HDD) mounted on the vehicle. The map information includes information on the position of the road, information on the shape of the road (for example, types of curves or straight roads, a curvature of the curve, or the like), information on the position of the intersection and the branch, and information on the position of a building. In addition, the map information includes set information such as a speed limit corresponding to the position of the lane on the map (for example, the legal maximum speed). The speed limit may be any speed equal to or lower than the legal maximum speed. The map information may include various types of traffic rule information (such as information on a lane changeable section, information on a lane-change impossible section, or the like) in association with the position of the lane on the map. The map database 4 may be stored in a computer in a facility such as a management processing center that can communicate with the vehicle.

Next, a functional configuration of the ECU 10 will be described. The ECU 10 includes a vehicle position recognition unit 11, a vehicle outside environment recognition unit 12, a travel state recognition unit 13, a moving object behavior detection unit 14, a behavior prediction calculation unit 15, a deviating moving object detection unit 16, a standard trajectory generation unit 17, an efficiency priority trajectory generation unit 18, a change suppressed trajectory generation unit 19, an emergency trajectory generation unit 20, the number-of-deviating-moving objects calculation unit 21, and a trajectory determination unit 22. A part of the functions of the ECU 10 described below may be performed by a server capable of communicating with the vehicle.

The vehicle position recognition unit 11 recognizes the position of the vehicle on the map based on the position information from the GPS receiver 1 and the map information from the map database 4. In addition, the vehicle position recognition unit 11 recognizes the position of the vehicle by a simultaneous localization and mapping (SLAM) technology using the information on the position of the fixed moving object such as utility poles included in the map information in the map database 4 and a result of detection performed by the external sensor 2. The vehicle position recognition unit 11 may recognize the position of the vehicle on the map using a known other methods.

The vehicle outside environment recognition unit 12 recognizes an outside environment of the vehicle based on a result of detection performed by the external sensor 2. The outside environment of the vehicle includes a position of the moving object with respect to the vehicle, a relative speed of the moving object to the vehicle, a moving direction of the moving object with respect to the vehicle, and the like. The vehicle outside environment recognition unit 12 recognizes the outside environment of the vehicle using a well-known method based on the image information from the camera and the information on the moving object from the radar sensor. If the outside environment of the vehicle is recognized, the vehicle outside environment recognition unit 12 reconstructs an outside environment of the vehicle including various properties of the outside environment on an arithmetic basis performed by the ECU 10. The vehicle outside environment recognition unit 12 may assign a moving object identification number or the like for each moving object regarding a moving object signal representing the moving object.

The travel state recognition unit 13 recognizes a state of the traveling vehicle based on a result of detection performed by the internal sensor 3. The travel state includes the vehicle speed of the vehicle, the acceleration of the vehicle, and the yaw rate of the vehicle. Specifically, the travel state recognition unit 13 recognizes the vehicle speed of the vehicle based on the vehicle speed information from the vehicle speed sensor. The travel state recognition unit 13 recognizes the acceleration (longitudinal acceleration and lateral acceleration) of the vehicle based on the information on the acceleration from the accelerator sensor. The travel state recognition unit 13 recognizes the yaw rate of the vehicle based on the information on the yaw rate from the yaw rate sensor.

The moving object behavior detection unit 14 detects a behavior of the moving object including at least the position of the moving object on the map and the speed of the moving object. The moving object behavior detection unit 14 detects the behavior of the moving object based on a result of detection performed by the external sensor 2. The moving object behavior detection unit 14 may detect the behavior of the moving object from the result of recognizing the outside environment of the vehicle performed by the vehicle outside environment recognition unit 12.

The moving object behavior detection unit 14 detects the behavior of the moving object by detecting the position of the moving object with respect to the vehicle and the speed of the moving object with respect to the vehicle based on, for example, the information on the moving object from the radar sensor. The moving object behavior detection unit 14 may use the camera instead of the radar sensor, and may use both the radar sensor and the camera.

The behavior of the moving object may include a moving direction of the moving object. The behavior of the moving object may include the acceleration and deceleration of the moving object. The moving object behavior detection unit 14 may acquire the position and speed of a moving object outside the detection range of the external sensor 2 by a wireless network communication such as a vehicle-to-vehicle communication. In this case, the moving object behavior detection unit 14 can detect the behavior of the moving object positioned far from the vehicle (for example, 1 km ahead or more). The moving object behavior detection unit 14 may limit the moving object to be detected only to the moving object on the road.

The behavior prediction calculation unit 15 calculates a behavior prediction of the moving object based on the result of detection performed by the external sensor 2 and the map information in the map database 4. The behavior prediction calculation unit 15 may calculate the behavior prediction of the moving object based on the behavior of the moving object detected by the moving object behavior detection unit 14 and the map information. The behavior prediction calculation unit 15 calculates the behavior prediction of the of the moving object after a set time (for example, one second or three seconds later) set in advance.

By referring to the map information, the behavior prediction calculation unit 15 can calculate the behavior prediction of the moving object from the current moving direction of the moving object and the current speed and acceleration (deceleration). For example, the behavior prediction calculation unit 15 may calculate the behavior prediction of the moving object under the assumption that the moving object in the lane travels along the lane at a speed equal to or lower than the speed limit. The behavior prediction calculation unit 15 may calculate a plurality of behavior predictions for one moving object by estimating a changeable range of the movement direction of the moving object and a changeable range of the speed of the moving object.

The behavior prediction calculation unit 15 recognizes the type of moving object such as a four-wheel vehicle, a two-wheel vehicle, a bicycle, a pedestrian, and the like, and then, may calculate the behavior prediction using a motion model prepared in advance according to the type of the moving object. In addition, the behavior prediction calculation unit 15 may calculate the behavior prediction of the moving object by adopting various well-known technologies relating to the behavior prediction of a vehicle and a pedestrian. In the behavior prediction calculation unit 15, the moving object of which the behavior is to be predicted may be limited to the moving object on the road. In this case, the behavior prediction calculation unit 15 may perform the calculation of the behavior prediction under the assumption that the moving object is a vehicle.

The deviating moving object detection unit 16 detects a deviating moving object which is a moving object deviating from a standard state set in advance. The standard state is a state in which the moving object does not deviate from the standard trajectory. The standard trajectory is a trajectory expected to not cause a collision between the moving objects or a collision between the moving object and the vehicle when all the moving objects take the standard trajectory. The standard trajectory is, for example, a trajectory in which a moving object traveling in the lane travels at a speed equal to or lower than the speed limit in the lane without deviating from the lane. The details of the standard trajectory can be set by another way. The standard trajectory may be a trajectory in which the moving object travels within a certain range in the lane width direction from a lane center. The standard trajectory may be a trajectory in which the moving object travels at a constant speed set separately from the speed limit regardless of the lane.

The deviating moving object detection unit 16 detects a deviating moving object based on the behavior of the moving object detected by the moving object behavior detection unit 14 and the behavior prediction of the moving object calculated by the behavior prediction calculation unit 15 and the map information. The deviating moving object includes a moving object predicted to deviate from the standard state within a time set in advance (for example, within 1 second).

The deviating moving object may not include a moving object that does not deviate from the standard state yet. That is, the deviating moving object detection unit 16 may detect only the moving object already deviating from the standard state as a deviating moving object based on the behavior of the moving object and the map information. In this case, the behavior prediction of the moving object calculated by the behavior prediction calculation unit 15 is unnecessary. If a sudden braking or a sudden acceleration that does not conform to the traffic flow is performed even when the moving object is traveling within the lane at a speed equal to or lower than the speed limit, the deviating moving object detection unit 16 may detect the moving object as a deviating moving object. The deviating moving object also includes a moving object that deviates from the standard state due to a lane change, and a moving object performing sudden braking or sudden acceleration due to a certain reason. In addition, the deviating moving object detection unit 16 may assign a deviation behavior signal regarding the presence or absence of the deviation to all the moving objects.

The standard trajectory generation unit 17 generates a standard trajectory that becomes a candidate of the autonomous driving trajectory. The standard trajectory is a trajectory of a standard range set in advance. The standard range can be, for example, a speed range close to the speed limit within a range of a path on which the vehicle travels within the same lane. The speed range close to the speed limit is, for example, a speed range of 80% to 100% of the speed limit. The speed limit may be set in any level. The range of a path on which the vehicle travels within the same lane may be a range of the path within a certain distance from the lane center in the lane width direction within the same lane. These points are the same in other trajectories.

In addition, the standard trajectory is a trajectory that conforms to the traffic flow and may be a trajectory not including the sudden braking and the sudden acceleration that disturbs the traffic flow. The standard trajectory can be a trajectory that keeps the traffic rules in the map information and avoids the approach between the vehicle and the moving object. This point is similar to an efficiency priority trajectory and a change suppressed trajectory described later. The approach between the vehicle and the moving object is, for example, a fact that a distance between the vehicle and the moving object is equal to or shorter than an approach threshold value set in advance. The standard trajectory may include a trajectory on which the vehicle overtakes a preceding vehicle by a lane change when the preceding vehicle is traveling at a rather low speed (for example, when traveling at a speed equal to or lower than half the speed limit).

The standard trajectory generation unit 17 generates the standard trajectory based on the map information in map database 4, the position of the vehicle on the map recognized by the vehicle position recognition unit 11, the outside environment of the vehicle recognized by vehicle outside environment recognition unit 12, the travel state of the vehicle recognized by the travel state recognition unit 13, and the result of detection of the deviating moving object performed by the deviating moving object detection unit 16. For example, the vehicle outside environment recognition unit 12 reconstructs the outside environment of the vehicle on an arithmetic basis, and then, the standard trajectory generation unit 17 can generate the standard trajectory as an appropriate trajectory in the standard range in the reconstructed outside environment of the vehicle.

The standard trajectory generation unit 17 outputs the generated standard trajectory as a standard trajectory signal. If it is not possible to generate a standard trajectory, such as when an urgent avoidance is required (when the trajectory of standard range cannot be generated), the standard trajectory generation unit 17 may output the standard trajectory signal as "none". The standard trajectory generation unit 17 may generate the standard trajectory that on which the vehicle can travel within the same lane at a speed range close to the speed limit from the position of the vehicle on the map and the map information.

The efficiency priority trajectory generation unit 18 generates an efficiency priority trajectory which is a candidate for the autonomous driving trajectory. The efficiency priority trajectory is a trajectory set in advance having an efficient range, that is, a trajectory in which a priority is given to a traveling efficiency. The efficient range is a speed range that is close to the speed limit, for example. In the efficient range in which an aggressive lane change is allowed to keep the speed range close to the speed limit without keeping the same lane for traveling. The efficiency priority trajectory is a trajectory in which the aggressive lane change is performed such that the vehicle speed can be kept to be a speed range close to the speed limit, for example, when the preceding vehicle is traveling at a speed slightly lower than the speed range close to the speed limit (for example, 60% of the speed limit).

Similarly to the standard trajectory, the efficiency priority trajectory is a trajectory along the traffic flow, which is a trajectory that does not include the sudden braking and the sudden acceleration so as to disturb the traffic flow. In addition, the efficiency priority trajectory can be a trajectory that keeps the traffic rules in the map information and avoids the approach between the vehicle and the moving object.

The efficiency priority trajectory generation unit 18 generates the efficiency priority trajectory based on the map information, the position of the vehicle on the map, the outside environment of the vehicle, the travel state of the vehicle, and the result of detection of the deviating moving object. For example, the vehicle outside environment recognition unit 12 reconstructs the outside environment of the vehicle on an arithmetic basis, and then, the efficiency priority trajectory generation unit 18 can generate the efficiency priority trajectory as an appropriate trajectory in the efficient range in the reconstructed outside environment of the vehicle. The efficiency priority trajectory generation unit 18 generates the efficiency priority trajectory so as to avoid the influence of the deviating moving object closest to vehicle though the lane change. The efficiency priority trajectory generation unit 18 outputs the generated efficiency priority trajectory as an efficiency priority trajectory signal. The efficiency priority trajectory generation unit 18 may output the efficiency priority trajectory signal as "none" if the efficiency priority trajectory cannot be generated because the lane change cannot be performed because there is no adjacent lane exists.

The change suppressed trajectory generation unit 19 generates a change suppressed trajectory which is a candidate for the autonomous driving trajectory. The change suppressed trajectory is a trajectory having a range of suppressing the change set in advance, that is, a trajectory in which a priority is given to the suppression of the change of the surrounding situation of the vehicle by minimizing the lane change. The surrounding situation is a situation such as the presence or absence of a preceding vehicle, for example. The change suppressed trajectory is a trajectory in which the change of the surrounding situation of the vehicle is suppressed, and eventually, a priority is given to carefulness.

The range of suppressing the change is, for example, range of a path on which the vehicle travels within the same lane. In the range of suppressing the change, the vehicle speed is set to a speed lower than the speed limit (for example, the speed equal to or lower than 70% of the speed limit). In addition, in the range of suppressing the change, the vehicle speed range can be set to a lower limit. The change suppressed trajectory is a trajectory in which the vehicle speed is lowered without changing the lane even if a preceding vehicle is traveling at a low speed, for example. The change suppressed trajectory can be used, for example, when a preceding vehicle is traveling at a low speed and the lane change cannot be performed because there is a vehicle traveling in parallel in the adjacent lane.

Similarly to the standard trajectory, the change suppressed trajectory is a trajectory that conforms to the traffic flow, and is a trajectory not including the sudden braking and the sudden acceleration that disturbs the traffic flow. In addition, the change suppressed trajectory can be a trajectory that keeps the traffic rules in the map information and avoids the approach between the vehicle and the moving object. The change suppressed trajectory can be generated as a trajectory that avoids at least the deviating moving object closest to the vehicle.

The change suppressed trajectory generation unit 19 generates the change suppressed trajectory based on the map information, the position of the vehicle on the map, the outside environment of the vehicle, the travel state of the vehicle, and the result of detection of the deviating moving object. For example, the vehicle outside environment recognition unit 12 reconstructs the outside environment of the vehicle on an arithmetic basis, and then, the change suppressed trajectory generation unit 19 can generate the change suppressed trajectory as an appropriate trajectory in the range of suppressing the change described above in the reconstructed outside environment of the vehicle. The change suppressed trajectory generation unit 19 outputs the generated change suppressed trajectory as a change suppressed trajectory signal. In an emergency situation where it is necessary to change the surroundings environment, the change suppressed trajectory generation unit 19 may output the change suppressed trajectory signal as "none" because the change suppressed trajectory cannot be generated.

The emergency trajectory generation unit 20 generates an emergency trajectory which is a candidate for the autonomous driving trajectory. The emergency trajectory generation unit 20 generates the emergency trajectory based on at least the outside environment of the vehicle and the travel state of the vehicle. The emergency trajectory generation unit 20 may further generate the emergency trajectory using the result of detection of the deviating moving object. The emergency trajectory is a trajectory used for an emergency situation such as when the possibility of contact between the vehicle and the moving object is high. The emergency trajectory generation unit 20 generates the emergency trajectory that will be best for avoiding the emergency situation or for reducing the impact (for example, a damage reduction) even if the sudden braking or the sudden acceleration is necessarily performed.

The emergency trajectory may be a trajectory in which the traffic rules can be kept to the extent that the emergency situation can be avoided. In this case, the emergency trajectory generation unit 20 generates the emergency trajectory with reference to the map information and the position of the vehicle on the map. The emergency trajectory generation unit 20 outputs the generated emergency trajectory as an emergency trajectory signal.

The number-of-deviating-moving objects calculation unit 21 calculates the number N of deviating moving objects which is the number of deviating moving objects interfering with the standard trajectory generated by the standard trajectory generation unit 17. The deviating moving object that interferes with the standard trajectory includes a deviating moving object positioned at a merging point (a point where a plurality of lanes merge each other) in front of the vehicle traveling on the standard trajectory. The deviating moving object that interferes with the standard trajectory may include a deviating moving object that interrupts in front of the vehicle traveling on the standard trajectory, or may include a deviating moving object that crosses the front of the vehicle traveling on the standard trajectory for the right or left turn from the adjacent lane or parking.

The number-of-deviating-moving objects calculation unit 21 calculates the number N of deviating moving objects that interfere with the standard trajectory based on the behavior of the deviating moving object and the behavior prediction of the deviating moving object, and the standard trajectory. The number-of-deviating-moving objects calculation unit 21 may refer to the map information. The number-of-deviating-moving objects calculation unit 21 does not necessarily need to use the behavior prediction of the deviating moving object. In addition, the deviating moving objects that interferes with the standard trajectory may be limited to the deviating moving objects positioned within a certain distance from the vehicle.

The trajectory determination unit 22 determines the autonomous driving trajectory from the standard trajectory, the efficiency priority trajectory, the change suppressed trajectory, and the emergency trajectory based on the number N of deviating moving objects calculated by the number-of-deviating-moving objects calculation unit 21. The trajectory determination unit 22 determines whether or not to set the standard trajectory as the autonomous driving trajectory based on the number N of deviating moving objects. The trajectory determination unit 22 determines whether or not to set the efficiency priority trajectory as the autonomous driving trajectory based on the number N of deviating moving objects. The trajectory determination unit 22 determines whether or not to set the change suppressed trajectory as the autonomous driving trajectory based on the number N of deviating moving objects. The trajectory determination unit 22 determines to set the standard trajectory as the autonomous driving trajectory if the number N of deviating moving objects interfering with the standard trajectory is smaller than a first value (N<first value) set in advance. The first value can be set to any value, for example, it can be set to 1.

The trajectory determination unit 22 determines to set the efficiency priority trajectory as the autonomous driving trajectory if the number N of deviating moving objects is the first value (N=first value) and the efficiency priority trajectory is generated. The trajectory determination unit 22 determines to set the change suppressed trajectory as the autonomous driving trajectory if the number N of deviating moving objects is greater than the first value (N>first value) and the change suppressed trajectory is generated. The trajectory determination unit 22 determines to set the emergency trajectory as the autonomous driving trajectory if the number N of deviating moving objects is greater than the first value but the change suppressed trajectory is not generated.

Figure 2:
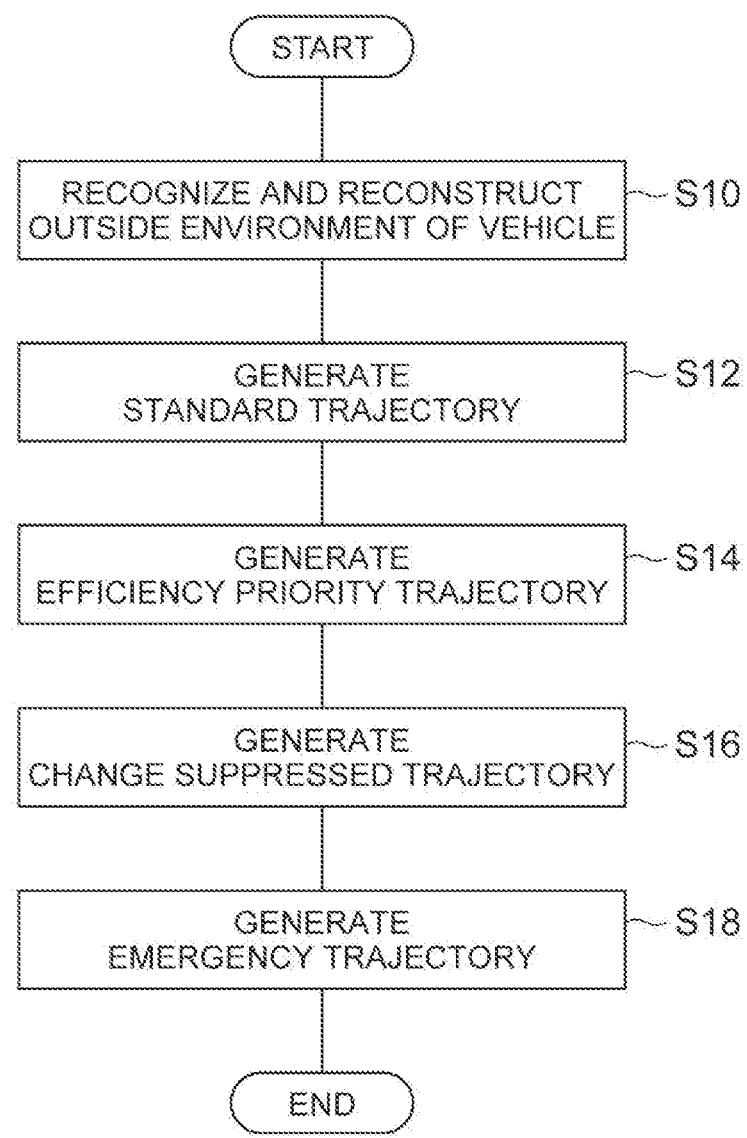
FIG. 2 is a flowchart illustrating an example of trajectory generation processing in the first embodiment.

Processing Performed by Autonomous Driving Trajectory Determination Device in First Embodiment Next, the processing performed by the autonomous driving trajectory determination device 100 in the first embodiment will be described with reference to the drawings.
Trajectory Generation Processing The trajectory generation processing performed by the autonomous driving trajectory determination device 100 in the first embodiment will be described with reference to FIG. 2. FIG. 2 is a flowchart illustrating an example of the trajectory generation processing in the first embodiment. The flowchart illustrated in FIG. 2 is executed during the autonomous driving, for example.

As illustrated in FIG. 2, as S10, the ECU 10 of the autonomous driving trajectory determination device 100 recognizes and reconstructs the outside environment of the vehicle using the vehicle outside environment recognition unit 12. The vehicle outside environment recognition unit 12 recognizes the outside environment of the vehicle based on the result of detection performed by the external sensor 2. In addition, the vehicle outside environment recognition unit 12 reconstructs the recognized outside environment of the vehicle on an arithmetic basis.

In S12, the ECU 10 generates the standard trajectory using the standard trajectory generation unit 17. The standard trajectory generation unit 17 generates the standard trajectory based on the map information, the position of the vehicle on the map, the outside environment of the vehicle, and the travel state of the vehicle. The standard trajectory generation unit 17 generates, for example, the standard trajectory having a speed range close to the speed limit in the range of a path on which the vehicle travels within the same lane.

In S14, the ECU 10 generates the efficiency priority trajectory using the efficiency priority trajectory generation unit 18. The efficiency priority trajectory generation unit 18 generates the efficiency priority trajectory based on the map information, the position of the vehicle on the map, the outside environment of the vehicle, and the travel state of the vehicle. The efficiency priority trajectory generation unit 18 generates the efficiency priority trajectory for overtaking the low speed preceding vehicle with an aggressive lane change, for example, in order to suppress the vehicle speed reduction of the vehicle and improve the traveling efficiency. The efficiency priority trajectory generation unit 18 does not generate the efficiency priority trajectory in such a case where the lane change cannot be performed.

In S16, the ECU 10 generates the change suppressed trajectory using the change suppressed trajectory generation unit 19. The change suppressed trajectory generation unit 19 generates the change suppressed trajectory based on the map information, the position of the vehicle on the map, the outside environment of the vehicle, and the travel state of the vehicle. For example, the change suppressed trajectory generation unit 19 generates the change suppressed trajectory in which the vehicle travels in the same lane by lowering the vehicle speed in order to suppress the changes of the surrounding situation of the vehicle even if the preceding vehicle is traveling at a low speed. The change suppressed trajectory generation unit 19 does not generate the change suppressed trajectory in the case of emergency situations where it is necessary to change the surrounding situation.

Figure 3:
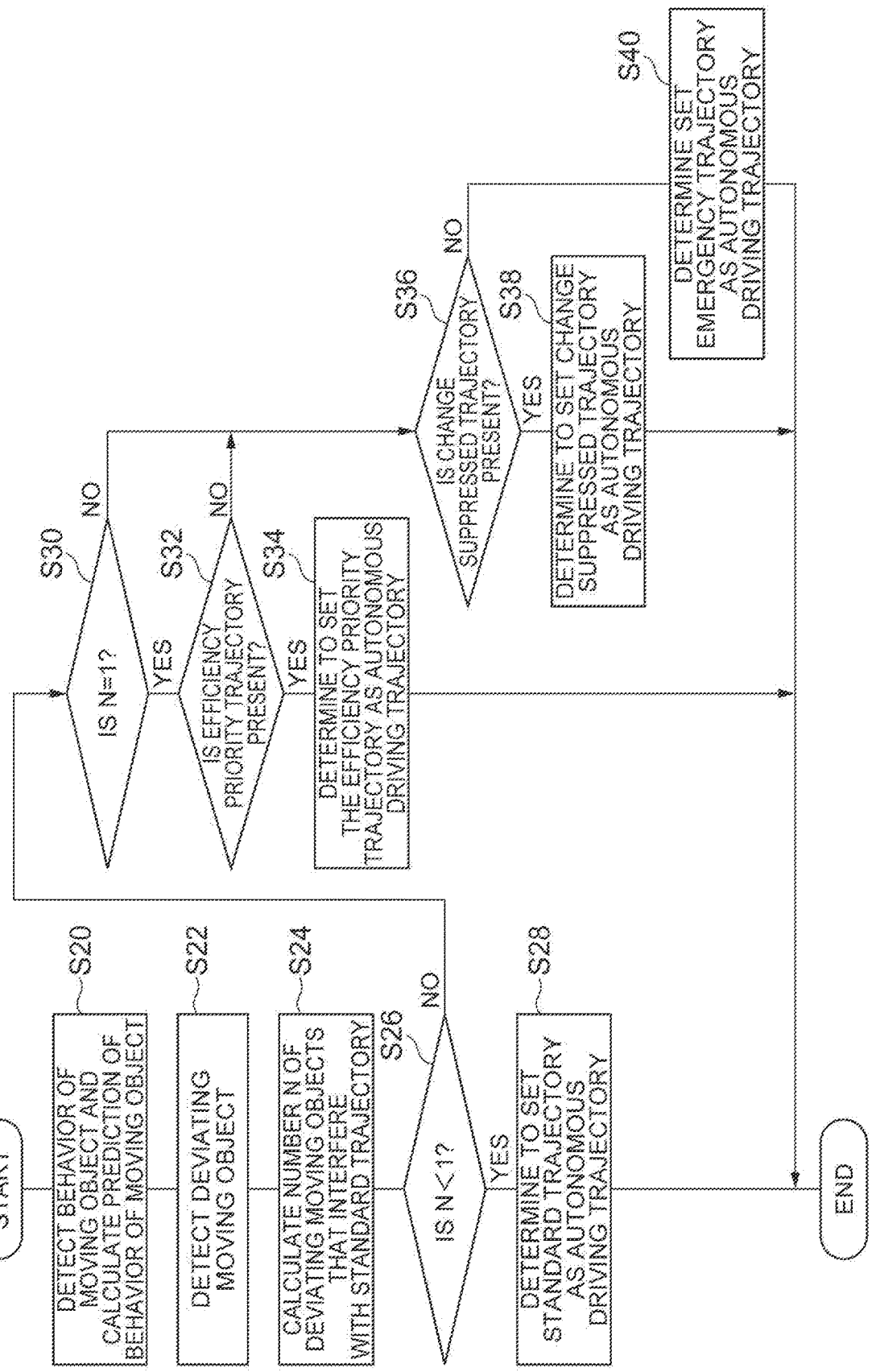
FIG. 3 is a flowchart illustrating an example of trajectory determination processing in the first embodiment.

In S18, the ECU 10 generates the emergency trajectory using the emergency trajectory generation unit 20. The emergency trajectory generation unit 20 generates the emergency trajectory based on at least the outside environment of the vehicle and the travel state of the vehicle. The emergency trajectory generation unit 20 generates the emergency trajectory for stopping the vehicle, for example, by sudden braking.
Trajectory Determination Processing Next, the trajectory determination processing performed by the autonomous driving trajectory determination device 100 in the first embodiment will be described with reference to FIG. 3. FIG. 3 is a flowchart illustrating an example of the trajectory determination processing in the first embodiment. The processing in the flowchart illustrated in FIG. 3 is executed when the trajectory generation processing illustrated in FIG. 2 is performed.

As illustrated in FIG. 3, in S20, the ECU 10 performs the detection of the behavior of the moving object using the moving object behavior detection unit 14 and the calculation of the behavior prediction of the moving object using the behavior prediction calculation unit 15. The moving object behavior detection unit 14 detects the behavior of the moving object by detecting the position of the moving object with respect to the vehicle and the speed of the moving object with respect to the vehicle based on the information on the moving object from the radar sensor, for example. The behavior prediction calculation unit 15 calculates the behavior prediction of the moving object based on the result of detection from the external sensor 2 and the map information in the map database 4.

In S22, the ECU 10 detects the deviating moving object using the deviating moving object detection unit 16. The deviating moving object detection unit 16 detects the deviating moving object which is a moving object deviating from the standard state set in advance based on the behavior of the moving object detected by the moving object behavior detection unit 14, the behavior prediction of the moving object calculated by the behavior prediction calculation unit 15, and the map information.

In S24, the ECU 10 calculates the number N of deviating moving objects that interfere with the standard trajectory using the number-of-deviating-moving objects calculation unit 21. The number-of-deviating-moving objects calculation unit 21 calculates the number N of deviating moving objects that interfere with the standard trajectory based on the behavior of the deviating moving object and the behavior prediction of the deviating moving object, and the standard trajectory.

In S26, the ECU 10 determines whether or not the number N of deviating moving objects is smaller than 1 (N<1) using the trajectory determination unit 22. If it is determined that the number N of deviating moving objects is smaller than 1 (YES in S26), the ECU 10 makes the process proceed to S28. If it is determined that the number N of deviating moving objects is equal to or greater than 1 (NO in S26), the ECU 10 makes the process proceed to S30.

In S28, the ECU 10 determines to set the standard trajectory as the autonomous driving trajectory using the trajectory determination unit 22. The trajectory determination unit 22 determines to set the standard trajectory which is a trajectory having the standard range as the autonomous driving trajectory. Thereafter, the ECU 10 ends the current trajectory determination processing.

In S30, the ECU 10 determines whether or not the number N of deviating moving objects is 1 (N=1) using the trajectory determination unit 22. If it is determined that the number N of deviating moving objects is 1 (YES in S30), the ECU 10 makes the process proceeds to S32. If it is determined that the number N of deviating moving objects is not 1 (that is, N>2) (NO in S30), the ECU 10 makes the process proceeds to S36.

In S32, the ECU 10 determines whether or not the efficiency priority trajectory is present using the trajectory determination unit 22. If it is determined that the efficiency priority trajectory is present (YES in S32), the ECU 10 makes the process proceed to S34. If it is determined that the efficiency priority trajectory is not present (NO in S32), the ECU 10 makes the process proceed to S36.

In S34, the ECU 10 determines to set the efficiency priority trajectory as the autonomous driving trajectory using the trajectory determination unit 22. The trajectory determination unit 22 determines to set the efficiency priority trajectory which is the trajectory having an efficient range as the autonomous driving trajectory. Thereafter, the ECU 10 ends the current trajectory determination processing.

In S36, the ECU 10 determines whether or not the change suppressed trajectory is present using the trajectory determination unit 22. If it is determined that the change suppressed trajectory is present (YES in S36), the ECU 10 makes the process proceed to S38. If it is determined that the change suppressed trajectory is not present (NO in S36), the ECU 10 makes the process proceed to S40.

In S38, the ECU 10 determines to set the change suppressed trajectory as the autonomous driving trajectory using the trajectory determination unit 22. The trajectory determination unit 22 determines to set the change suppressed trajectory which is a trajectory having the range of suppressing the change of the surrounding situation of the vehicle as the autonomous driving trajectory. Thereafter, the ECU 10 ends the current trajectory determination processing.

In S40, the ECU 10 determines to set the emergency trajectory as the autonomous driving trajectory using the trajectory determination unit 22. The trajectory determination unit 22 determines to set the emergency trajectory which is a trajectory corresponding to the emergency situation as the autonomous driving trajectory. Thereafter, the ECU 10 ends the current trajectory determination processing.

Operational Effects of Autonomous Driving Trajectory Determination Device in First Embodiment According to the autonomous driving trajectory determination device 100 in the first embodiment described above, the deviating moving objects deviating from a standard state set in advance is detected and the number N of deviating moving objects which is the number of deviating moving objects interfering with the standard trajectory is calculated, and then, whether or not to set the standard trajectory as the autonomous driving trajectory is determined based on the number N of deviating moving objects. Therefore, it is possible to appropriately determine the autonomous driving trajectory compared to the case where the number of deviating moving objects interfering with the standard trajectory is not taken into consideration. In the autonomous driving trajectory determination device 100, an efficiency priority trajectory in which the priority is given to the traveling efficiency is generated and a change suppressed trajectory in which the priority is given to suppressing the change of surrounding situation is generated. Therefore, it is possible to appropriately determine the autonomous driving trajectory from the standard trajectory, the efficiency priority trajectory, the change suppressed trajectory, and the like based on the number N of deviating moving objects.

In the autonomous driving trajectory determination device 100, with a view point of whether the standard trajectory can be kept or not, by focusing on the number N of deviating moving objects which is the number of deviating moving objects interfering with the standard trajectory out of the deviating moving object deviating from the standard state, it is possible to appropriately switch the trajectories relating to different evaluation criteria such as the safety and the efficiency. In addition, according to the autonomous driving trajectory determination device 100, it is possible to detect the moving object which has not deviated from the standard state yet as a deviating moving object in advance using the moving object behavior prediction. Therefore, it is possible to appropriately determine the autonomous driving trajectory. The moving object behavior prediction may be a behavior prediction corresponding to the assumption of "may be" that realizes so-called "may be driving". In the moving object behavior prediction, the behavior prediction may be performed assuming the existence of the moving object even if the moving object is not actually detected.

Similarly, in the autonomous driving trajectory determination device 100, the efficiency priority trajectory in which the priority is given to the traveling efficiency is generated, and thus, it is possible to determine whether or not to set the efficiency priority trajectory as the autonomous driving trajectory based on the number N of deviating moving objects. In addition, in the autonomous driving trajectory determination device 100, a change suppressed trajectory in which the priority is given to suppressing the change of the surrounding situation, and thus, it is possible to determine whether or not to set the change suppressed trajectory as the autonomous driving trajectory based on the number N of deviating moving objects.

Second Embodiment

Figure 4:
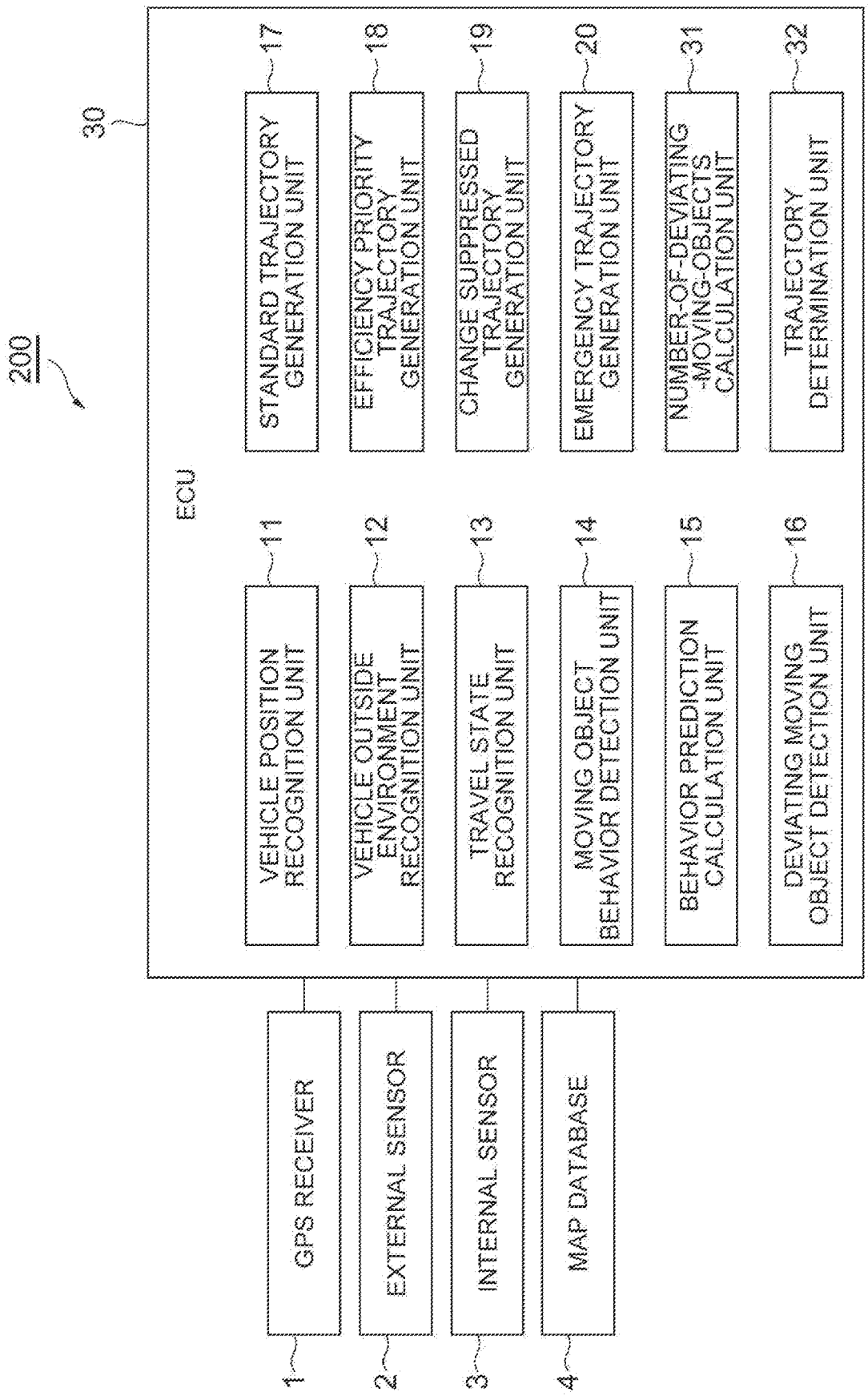
FIG. 4 is a block diagram illustrating an autonomous driving trajectory determination device in a second embodiment.

Next, an autonomous driving trajectory determination device in a second embodiment will be described with reference to the drawings. FIG. 4 is a block diagram illustrating the autonomous driving trajectory determination device in the second embodiment. An autonomous driving trajectory determination device 200 illustrated in FIG. 4 is different from that the first embodiment in a point that the number of deviating moving objects is calculated under the assumption that the predetermined number of moving objects out of the moving objects which are not deviating moving objects are the deviating moving objects. The same reference numerals are given to the same or corresponding configuration elements in the first embodiment and the description thereof will be omitted.

Configuration of Autonomous Driving Trajectory Determination Device in Second Embodiment As illustrated in FIG. 4, in the autonomous driving trajectory determination device 200 in the second embodiment, the functions of the number-of-deviating-moving objects calculation unit 31 and the trajectory determination unit 32 in the ECU 30 is different from those in the first embodiment.

The number-of-deviating-moving objects calculation unit 31 calculates the number N of deviating moving objects interfering with the standard trajectory based on the behavior of the deviating moving object and the behavior prediction of the deviating moving object and the standard trajectory. If a moving object which is not a deviating moving object is present around the vehicle, the number-of-deviating-moving objects calculation unit 31 calculates the number N of deviating moving objects under the assumption that the predetermined number (for example, 1) of moving objects around the vehicle are deviating moving objects. "Around the vehicle" means, for example, within a certain distance from the vehicle. "Around the vehicle" may be limited to in front of the vehicle. The moving object around the vehicle may be a moving object positioned within a certain distance from the standard trajectory.

If a moving object which is not a deviating moving object is present, the number-of-deviating-moving objects calculation unit 31 assumes that the moving object with the largest influence on the standard trajectory is a deviating moving object. The largest influence on the standard trajectory is a case where the variation amount of the standard trajectory (a separated distance in the width direction of the path, a difference in the speed, or the like) is the largest compared to the current standard trajectory with the standard trajectory generated under the assumption that the target moving object is not present.

If the predetermined number is equal to or greater than 2, the number-of-deviating-moving objects calculation unit 31 calculates the influence on the standard trajectory (the variation amount of the standard trajectory under the assumption that the moving object is not present), and then, assumes that the predetermined number of moving objects are the deviating moving objects in an order from the moving object with a larger influence on the standard trajectory. The number-of-deviating-moving objects calculation unit 31 calculates the number N of deviating moving objects by adding the number of assumed deviating moving objects to the number of deviating moving objects that interfere with the standard trajectory out of the deviating moving objects detected by the deviating moving object detection unit 16.

The number-of-deviating-moving objects calculation unit 31 may select the moving object assumed to be the deviating moving object according to other criteria not in the order of larger influence on the standard trajectory. The number-of-deviating-moving objects calculation unit 31 may assume that the moving object is the deviating moving object in an order of closer to the vehicle or may assume that the moving object is the deviating moving object in an order of higher speed of the moving object.

If the number N of deviating moving objects is equal to or smaller than a second value (N≤second value) set in advance, the trajectory determination unit 32 determines whether or not the efficiency priority trajectory is present. The second value can be set as any value, for example, 2.

If it is determined that the efficiency priority trajectory is present, the trajectory determination unit 32 determines whether or not there is enough time to switch the trajectory from the standard trajectory to the efficiency priority trajectory based on the standard trajectory and the efficiency priority trajectory. The fact that there is enough time to switch the trajectory from the standard trajectory to the efficiency priority trajectory means that it is possible to smoothly switch the trajectory from the standard trajectory in the same lane to the efficiency priority trajectory after lane change. In this case, the speed can be the same in the standard trajectory and the efficiency priority trajectory, but only the traveling lanes are different from each other.

If it is determined that there is enough time to switch the trajectory from the standard trajectory to the efficiency priority trajectory, since it is assumed that the moving object which is not the deviating moving object is the deviating moving object, the trajectory determination unit 32 temporarily determines that the standard trajectory is the autonomous driving trajectory. In this way, it is possible for the trajectory determination unit 32 to avoid the unnecessary lane changes due to the assumption of deviating moving object.

On the other hand, if it is determined that there is no enough time to switch the trajectory from the standard trajectory to the efficiency priority trajectory, the trajectory determination unit 32 determines that the efficiency priority trajectory is the autonomous driving trajectory. The efficiency priority trajectory in this case, for example, can be a trajectory in which the vehicle is separated a certain distance from the moving object assumed to be the deviating moving object or a trajectory in which the lane change can be performed such that the vehicle overtakes the moving object.

If the number N of deviating moving objects exceeds the second value (N>second value) and the change suppressed trajectory is present, the trajectory determination unit 32 determines that the change suppressed trajectory is the autonomous driving trajectory. If the number N of deviating moving objects exceeds the second value (N>second value) and the change suppressed trajectory is not present, the trajectory determination unit 32 determines that the emergency trajectory is the autonomous driving trajectory.

Processing Performed by Autonomous Driving Trajectory Determination Device in Second Embodiment Next, the processing for determining the autonomous driving trajectory performed by the autonomous driving trajectory determination device 200 in the second embodiment will be described with reference to FIG. 5. The trajectory generation processing is the same as that in the first embodiment, and the description thereof will be omitted.

FIG. 5 is a flowchart illustrating an example of the trajectory determination processing in the second embodiment. The processing in the flowchart illustrated in FIG. 5 is executed when the trajectory generation processing is performed. Since the processing items in S50 and S52 are the same as the processing items in S20 and S22 in FIG. 3, and thus, the description thereof will be simplified.

As illustrated in FIG. 5, as S50, the ECU 30 of the autonomous driving trajectory determination device 200 detects the behavior of the moving object using the moving object behavior detection unit 14 and calculates the behavior prediction of the moving object using the behavior prediction calculation unit 15. In S52, the ECU 30 detects the deviating moving object using the deviating moving object detection unit 16.

In S54, the ECU 30 calculates the number N of deviating moving objects using the number-of-deviating-moving objects calculation unit 31. The number-of-deviating-moving objects calculation unit 31 calculates the number N of deviating moving objects under the assumption that the predetermined number (for example, 1) of moving objects are deviating moving objects. The number-of-deviating-moving objects calculation unit 31 calculates the number N of deviating moving objects by adding the number of assumed deviating moving objects to the number of deviating moving objects that interfere with the standard trajectory out of the deviating moving objects detected by the deviating moving object detection unit 16. If the moving object is not present around the vehicle, the number-of-deviating-moving objects calculation unit 31 does not need to make assumptions of the deviating moving object.

In S56, the ECU 30 determines whether or not the number N of deviating moving objects is 0 (N=0) using the trajectory determination unit 32. If it is determined that the number N of deviating moving objects is 0 (YES in S56), the ECU 30 makes the process proceed to S64. If it is determined that the number N of deviating moving objects is not 0 (NO in S56), the ECU 30 makes the process proceed to S58.

In S58, the ECU 30 determines whether or not the number N of deviating moving objects is equal to or smaller than 2 (N≤2) using the trajectory determination unit 32. If it is determined that the number N of deviating moving objects is equal to or smaller than 2 (YES in S58), the ECU 30 makes the process proceed to S60. If it is determined that the number N of deviating moving objects exceeds 2 (NO in S58), the ECU 30 makes the process proceed to S68.

In S60, the ECU 30 determines whether or not the efficiency priority trajectory is present using the trajectory determination unit 32. If it is determined that the efficiency priority trajectory is present (YES in S60), the ECU 30 makes the process proceed to S62. If it is determined that the efficiency priority trajectory is not present (NO in S60), the ECU 30 makes the process proceed to S68.

In S62, the ECU 30 determines whether or not there is enough time to switch the trajectory from the standard trajectory to the efficiency priority trajectory using the trajectory determination unit 32. The trajectory determination unit 32 determines whether or not there is enough time to switch the trajectory from the standard trajectory to the efficiency priority trajectory based on the standard trajectory and the efficiency priority trajectory. If it is determined that there is enough time to switch the trajectory from the standard trajectory to the efficiency priority trajectory (YES S62), the ECU 30 makes the process proceed to S64. If it is determined that there is no enough time to switch the trajectory from the standard trajectory to the efficiency priority trajectory (NO S62), the ECU 30 makes the process proceed to S66.

In S64, the ECU 30 determines that the standard trajectory is the autonomous driving trajectory using the trajectory determination unit 32. Thereafter, the ECU 30 ends the current trajectory determination processing.

In S66, the ECU 30 determines that the efficiency priority trajectory is the autonomous driving trajectory using the trajectory determination unit 32. Thereafter, the ECU 30 ends the current trajectory determination processing.

In S68, the ECU 30 determines whether or not the change suppressed trajectory is present using the trajectory determination unit 32. If it is determined that the change suppressed trajectory is present (YES in S68), the ECU 30 makes the process proceed to S70. If it is determined that the change suppressed trajectory is not present (NO in S68), the ECU 30 makes the process proceed to S72.

In S70, the ECU 30 determines that the change suppressed trajectory is the autonomous driving trajectory using the trajectory determination unit 32. Thereafter, the ECU 30 ends the current trajectory determination processing.

In S72, the ECU 30 determines that the emergency trajectory is the autonomous driving trajectory using the trajectory determination unit 32. Thereafter, the ECU 30 ends the current trajectory determination processing.

Operational Effects of Autonomous Driving Trajectory Determination Device in Second Embodiment According to the autonomous driving trajectory determination device 200 in the second embodiment described above, by calculating the number N of deviating moving objects under the assumption that a predetermined number of moving objects are the deviating moving objects around the vehicle, it is possible to determine the autonomous driving trajectory that can cope with a case where the moving object in the standard state deviates from the standard state. In addition, according to the autonomous driving trajectory determination device 200, if there is enough time to switch the trajectory from the standard trajectory to the efficiency priority trajectory, since the standard trajectory can be kept as much as possible, it is possible to suppress the unnecessary lane change.

As above, the preferred embodiments of the present disclosure have been described above, however, the present disclosure is not limited to the above-described embodiments. The present disclosure can be implemented in various forms including various modifications and improvements based on the knowledge of those skilled in the art, including the above-described embodiments.

The efficiency priority trajectory may be generated from the viewpoint of fuel economy as well as the traveling efficiency. If overtaking the preceding vehicle is inefficient from the viewpoint of fuel economy even when the traveling efficiency is high, the efficiency priority trajectory may be a trajectory in which the overtaking is not performed by changing the lane. Such an efficiency priority trajectory can be generated from at least the position of the vehicle on the map, the map information, and the outside environment of the vehicle.

The autonomous driving trajectory determination devices 100 and 200 do not necessarily need to generate the efficiency priority trajectory. In this case, the ECUs 10 and 30 do not need to include the efficiency priority trajectory generation unit 18. Similarly, the autonomous driving trajectory determination devices 100 and 200 do not necessarily need to generate the change suppressed trajectory. In this case, the ECUs 10 and 30 do not need to include the change suppressed trajectory generation unit 19.

The autonomous driving trajectory determination devices 100 and 200 may be configured to determine that the emergency trajectory is the autonomous driving trajectory only if it is determined that a moving object that may come in contact with the vehicle is present. If the moving object that may come into contact with the vehicle is not present and change suppressed trajectory cannot be generated, the autonomous driving trajectory determination devices 100 and 200 may be configured to end the autonomous driving upon notifying the driver. The emergency trajectory does not necessarily need to be generated.

Without being needed to calculate the behavior prediction of the moving object, the autonomous driving trajectory determination devices 100 and 200 may be configured in such an aspect that only the moving object that deviates from the standard state is included in the deviating moving object. In this case, the ECUs 10 and 30 do not need to include the behavior prediction calculation unit 15.

What is claimed is:

1. An autonomous driving trajectory determination device that is configured to determine an autonomous driving trajectory of a vehicle, comprising: an electronic control unit (ECU) configured to:
   generate a standard trajectory for the autonomous driving of the vehicle based on a position of the vehicle on a map and map information;
   detect a behavior of at least one moving object, the detected behavior of the at least one moving object including at least a speed and a position on the map of a moving object other than the vehicle;
   detect a deviating moving object that deviates from a standard state set in advance out of the at least one moving object based on the detected behavior of the at least one moving object and the map information;
   calculate a number of deviating moving objects, which is a number of deviating moving objects interfering with the standard trajectory; and
   determine whether or not to set the standard trajectory as the autonomous driving trajectory based on the number of deviating moving objects.

2. The autonomous driving trajectory determination device according to claim 1, wherein the ECU is further configured to:
   calculate a moving object behavior prediction which is a behavior prediction of the at least one moving object based on the behavior of the at least one moving object and the map information, and
   detect the deviating moving object based on the behavior of the at least one moving object, the at least one moving object behavior prediction, and the map information.

3. The autonomous driving trajectory determination device according to claim 1, wherein the ECU is further configured to:
   generate an efficiency priority trajectory in which a priority is given to a traveling efficiency based on the position of the vehicle on the map, the map information, and an outside environment of the vehicle, and
   determine whether or not to set the efficiency priority trajectory as the autonomous driving trajectory based on the number of deviating moving objects.

4. The autonomous driving trajectory determination device according to claim 1, wherein the ECU is further configured to:
   generate a change suppressed trajectory in which a priority is given to suppression of a change of a surrounding situation of the vehicle based on the position of the vehicle on the map, the map information, and an outside environment of the vehicle, and
   determine whether or not to set the change suppressed trajectory as the autonomous driving trajectory based on the number of deviating moving objects.

5. The autonomous driving trajectory determination device according to claim 1 wherein the ECU is further configured to,
   calculate the number of deviating moving objects under an assumption that a predetermined number of moving objects, which are not deviating moving objects around the vehicle, correspond to the deviating moving object.

6. The autonomous driving trajectory determination device according to claim 2, wherein the ECU is further configured to:
   generate an efficiency priority trajectory in which a priority is given to a traveling efficiency based on the position of the vehicle on the map, the map information and an outside environment of the vehicle, and
   determine whether or not to set the efficiency priority trajectory as the autonomous driving trajectory based on the number of deviating moving objects.

7. The autonomous driving trajectory determination device according to claim 2, wherein the ECU is further configured to:
   generate a change suppressed trajectory in which a priority is given to suppression of a change in the surrounding situation of the vehicle based on the position of the vehicle on the map, the map information and an outside environment of the vehicle, and
   determine whether or not to set the change suppressed trajectory as the autonomous driving trajectory based on the number of deviating moving objects.

8. The autonomous driving trajectory determination device according to claim 3, wherein the ECU is further configured to:
   generate a change suppressed trajectory in which the priority is given to the suppression of the change of the surrounding situation of the vehicle based on the position of the vehicle on the map, the map information and the outside environment of the vehicle, and
   determine whether or not to set the change suppressed trajectory as the autonomous driving trajectory based on the number of deviating moving objects.

9. The autonomous driving trajectory determination device according to claim 2, wherein the ECU is further configured to:

calculate the number of deviating moving objects under an assumption that a predetermined number of moving objects, which are not deviating moving objects around the vehicle, correspond to the deviating moving object.

10. The autonomous driving trajectory determination device according to claim 3, wherein the ECU is further configured to:
calculate the number of deviating moving objects under an assumption that a predetermined number of moving objects out, which are not deviating moving objects around the vehicle, correspond to the deviating moving object.

11. The autonomous driving trajectory determination device according to claim 4, wherein the ECU is further configured to:
calculate the number of deviating moving objects under an assumption that a predetermined number of moving objects, which are not deviating moving objects around the vehicle, correspond to the deviating moving object.

12. The autonomous driving trajectory determination device according to claim 1, wherein the vehicle is configured to travel on the ground.

13. The autonomous driving trajectory determination device according to claim 1,
wherein the ECU is configured to calculate the number of deviating moving objects, based on the deviating moving objects interfering with the standard trajectory by being located on the standard trajectory or entering into the standard trajectory.

* * * * *